Feb. 14, 1933.   S. P. VAUGHN   1,897,155
THERMOSTATIC VALVE
Filed April 6, 1931   2 Sheets-Sheet 2
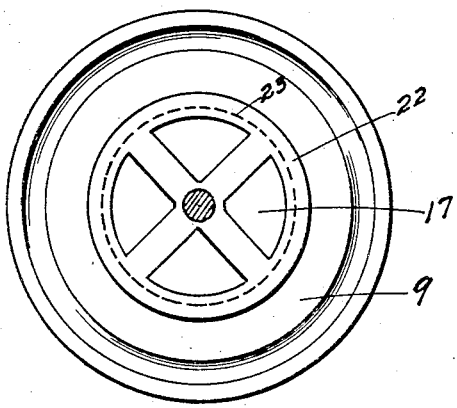
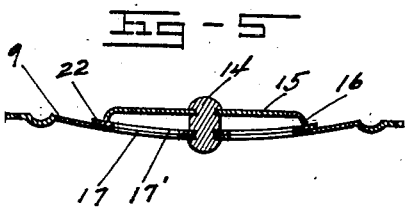
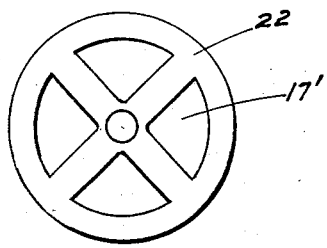
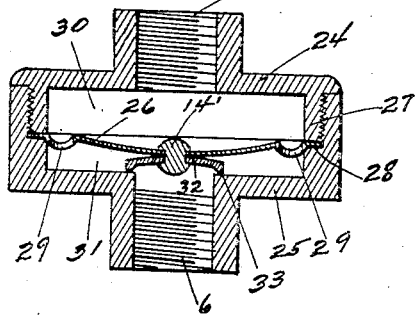
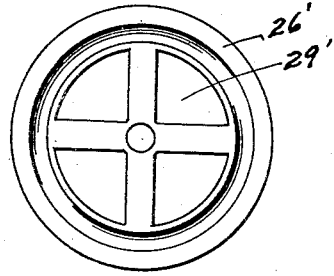
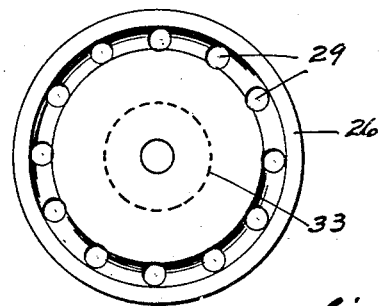
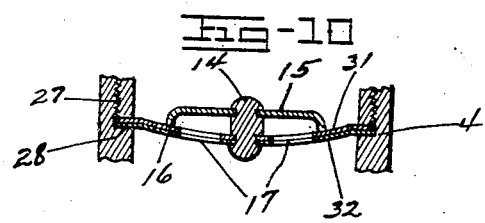
Sidney P. Vaughn INVENTOR Patented Feb. 14, 1933

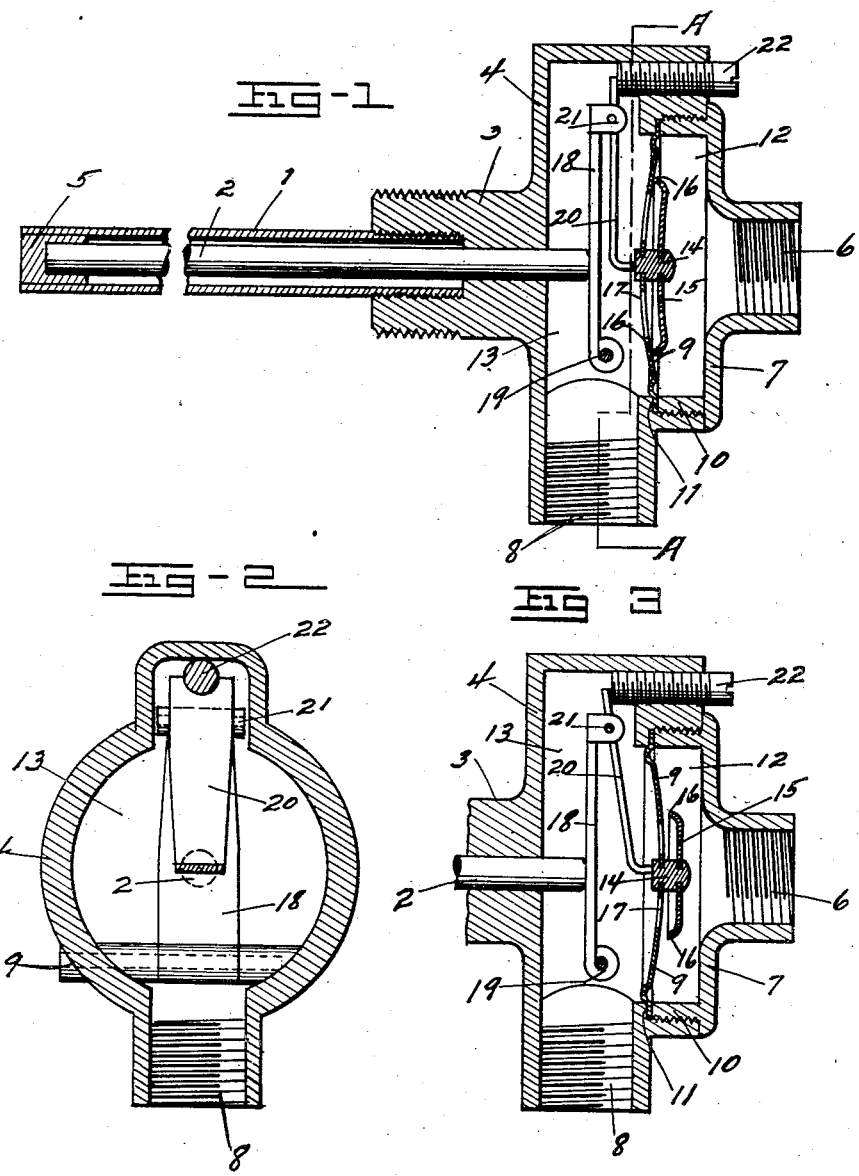

1,897,155

UNITED STATES PATENT OFFICE

SIDNEY P. VAUGHN, OF THE UNITED STATES NAVY, ACKERMAN, MISSISSIPPI

THERMOSTATIC VALVE

Application filed April 6, 1931. Serial No. 528,055.

(GRANTED UNDER THE ACT OF MARCH 3, 1883, AS AMENDED APRIL 30, 1928; 370 O. G. 757)

I agree that the invention may be manufactured and used by or for the Government for governmental purposes without the payment to me of any royalty thereon.

This invention relates to thermostatically operated diaphragm valves adapted to control the flow of gaseous fuels to burners, but more particularly to those especially adapted to the requirements of temperature control devices for water heaters, ovens and similar devices.

The thermostatic valve of my invention may be either a snap action type or a slow action type using a normally concavo-convex or dished spring or flexible diaphragm which separates the intake side of the valve from the outlet side and in which the valve proper is formed. The valve is opened or closed by causing the center of the diaphragm to move past dead center from one side to the other. Normally the concave side of the diaphragm will be on the intake side and in this position the valve will be closed. When the diaphragm is caused to attain a reverse form, that is, a convexo-concave form with the convex side toward the intake side of the valve body, the valve will be opened.

The principal object of this inventon is to provide a thermostatic valve in which the valve proper is devoid of sliding surfaces and one that will not stick open or closed because of gummy substances usually found in natural gases. In a large number of thermostatic valves now on the market, the valve member is carried on a valve stem slidably mounted in a guide. When this type of valve is used to control the flow of impure gases, the valve stem very quickly becomes sticky and does not function properly causing unnecessary expense to clean out the valve.

Another object is to provide a new type of diaphragm valve in which the diaphragm proper acts as the dividing wall between the intake chamber and the outlet chamber in the valve body. This method of construction simplifies the valve and reduces the cost of construction.

Another object is to provide a diaphragm construction embodying the valve proper and which is opened or closed by moving the center of the diaphragm past its dead center from one side to the other.

These and other objects will be set forth fully in the following specifications and the accompanying drawings, in which:

Fig. 1 is a vertical sectional elevation of a thermostatic valve including my invention and showing the valve closed. Fig. 2 is a sectional plan view on line A—A, Fig. 1. Fig. 3 is the same as Fig. 1 but shows the valve open after the thermostatic elements have functioned. Fig. 4 is a plan view of the diaphragm with the valve removed. Fig. 5 is an enlarged cross sectional view of the diaphragm and valve construction. Fig. 6 is a plan view of a washer used to obtain a gas tight seating of the valve. Fig. 7 is a vertical sectional view of a check valve including my invention. Fig. 8 illustrates a modified form of diaphragm. Fig. 9 illustrates a plan view of the diaphragm used in Fig. 7. Fig. 10 is a modified form of thermostatic valve including my invention.

Like numerals refer to like parts throughout the several views.

One form of thermostatic valve embodying my invention is illustrated in Figs. 1, 2 and 3. The thermostatic elements comprise a tube 1 having a high coefficient of expansion, such as copper, and a rod 2 having a low coefficient of expansion, such as invar, mounted within the copper tube. The inner end of the tube 1 is threaded or otherwise suitably fixed in the bore of an externally threaded neck 3 of a cast hollow valve body 4. The rod 2 is secured at its outer end in a plug 5 fixed gas tight in the outer end of the tube 1. The inner end of the rod 2 is slidably mounted in the bore of the neck 3 and passes through into the chamber of the valve body 4 where it makes contact with a train of amplification levers to be described later.

By virtue of this connection it is evident that expansion and contraction of the tube 1 in response to temperature changes results in slight endwise movement of the inner end of the rod 2.

The neck 3 extending from the valve body 4 is externally threaded to screw into the walls of the receptacle containing the fluid to be heated and of which it is desired to control the temperature. The thermostatic tube 1 is thus surrounded by the fluid and expands or contracts in response to temperature changes of the fluid.

The valve body 4 has an inlet port 6 formed in a closure or cap member 7 which is threaded into the bore of the valve body. The inlet port connects to the gas mains or source of gas supply. The valve body also has an outlet port 8 connected to the burner used to heat the fluid. The flow of the gas from the inlet port to the outlet port 8 is controlled by a diaphragm type of valve which forms the subject of the present invention. The diaphragm valve illustrated comprises a normally concavo-convex disc 9 of spring material, the periphery of which is clamped gas tight between the skirt 10 of the cap member 7 and an annular shoulder 11 formed in the bore of the valve body. The diaphragm forms a wall dividing the bore of the body into a receiving chamber 12 and a delivery chamber 13 which are connected by valve openings 17 formed in the diaphragm. The flow of the gas through the valve openings 17 is controlled by a mushroom type of valve 15 fixed concentrically to the normally concave side of the diaphragm by a stem 14 connecting the center of the valve member 15 to the center of the diaphragm 9. The concave side of the valve member 15 faces the normally concave side of the diaphragm 9 and has its periphery cupped or beveled to form an annular knife edged shoulder 16 arranged to have line contact with the normally concave side of the diaphragm when the valve is closed, or, more specifically on the circumference of a circle of a radius less than the radius of the diaphragm. The normally concave side of the diaphragm forms the seat of the valve, and valve openings 17 are formed in the diaphragm 9 beneath the valve 15 and between the stem 14 and the shoulder 16 for the passage of gas when the valve member is unseated. The valve is opened by causing the diaphragm to attain a reverse or convexo-concave form as illustrated in Fig. 3 which raises the knife edged shoulder 16 of the valve member 15 away from the diaphragm. In valves of the snap action type the valve 15 is preferably made of spring material which, when seated tightly to the diaphragm becomes slightly dished as illustrated in Fig. 1 but flattens out when unseated as illustrated in Fig. 3. The valve member 15 is arranged to be unseated under an impulse of the thermostatic rod 2 acting through the intermediary of an amplification lever system arranged in the delivery chamber 13. The lever system comprises a lever of the third class 18 and a second lever 20 of the first class pivoted at 21 to the free end of the third class lever 18. The third class lever 18 is pivoted at 19 to the inner walls of the delivery chamber 13 and has the inner end of the thermostatic rod 2 bearing against it near the pivot point to communicate rocking motion to the lever in event of contraction or expansion of the tubular element 1 of the thermostat. The long arm of the first class lever 20 is arranged in contact with the center of the normally convex side of the diaphragm 9 to communicate motion thereto and the short arm of the lever 20 is arranged in contact with an adjustment screw 22 provided in the body of the valve to advance or retard the action of the thermostatic rod 2 with reference to the diaphragm. It is evident that when the third class lever 18 is rocked the first class lever 20 will also rock on its pivot when the short arm of the first class lever 20 makes contact with the adjustment screw 22, and that a large amount of amplification may be obtained to actuate the valve. In order to obtain a snap action in the above type of valve I prefer to make the diaphragm of spring material and arrange it to snap over dead center from its normal concavo-convex form when sufficient pressure is applied to the convex side by the resilient lever 20, and to have it snap back into its normal concavo-convex form when the pressure is removed.

In operation when the lever 18 has moved sufficiently to bring the short arm of the lever 20 into contact with the adjustment screw 22, the long arm of the lever 20 will move into contact with the convex side of the diaphragm 9 and exert a pressure thereon. When the pressure is sufficient the center of the diaphragm will snap over dead center into a reverse form. In the beginning the center of the diaphragm will move slightly tending to open the valve, but due to the resiliency of the valve member 15 and the fact that it has already been forced into a slightly dished form the shoulder 16 will continue to make contact with the diaphragm until the pressure exerted by the lever 20 is sufficient to snap the center of the diaphragm over dead center, after which the shoulder 16 of the valve member becomes unseated as illustrated in Fig. 3 and opens the valve. When the pressure on the diaphragm is relieved it will snap back into its original form due to the tension set up therein, and the valve member 15 will seat itself and close the valve.

In Figs. 4 and 5 an enlarged view of the diaphragm valve is shown and also shows the application of a flexible washer 22, made of any suitable material such as leather, to obtain a better seating of the valve member 15 and to prevent leaks. Fig. 6 illustrates a plan view of the washer which has openings 17 that align with the openings 17 in the diaphragm. The dotted lines 23 in Fig. 4 show the line contact made by the cupped edge or shoulder 16 of the valve member 15. Where a slow valve movement is desired the diaphragm 9 need not be resilient, but may be made of any flexible material that will change from a concavo-convex form to a convexo-concave form when pressure is applied to the normally convex side, and regain its normal form when the pressure of the gases on the inlet side exceeds the reduced pressure exerted on the opposite side by the lever. When necessary a compression spring may be placed between the diaphragm 9 and the cap member 7 to force the diaphragm to regain its normal form when the pressure exerted by the lever 20 is reduced.

In Figs. 7 and 9 I illustrate the application of the principles to a check valve adapted to operate under high pressures. The male end 24 of the valve body is threaded into the female end 25 and a flexible diaphragm 26 is clamped tight between the skirt 27 of the male end and an annular shoulder 28 formed in the bore of the female end. The diaphragm divides the bore into a receiving chamber 31 and a delivery chamber 30, and has openings 29 formed therein for the passage of the fluid from one chamber to the other. The diaphragm carries a valve member 32 riveted to the inlet side of the diaphragm with the face of the valve member 32 concentrically arranged toward the inlet 6, the inner end of which forms the valve seat 33. In Fig. 7 the valve is shown closed, but in operation when the fluid pressure on the face of the valve is greater than that on the back the valve will open. When the pressures are reversed the valve will be closed. Instead of using a diaphragm such as illustrated in Fig. 9 it may take the form of the diaphragm 26' illustrated in Fig. 8, in which the openings 29' are near the center of the diaphragm.

Another type of thermostatic valve is illustrated in Fig. 10 in which the diaphragm is a relatively thin sheet consisting of two metals having different thermal coefficients of expansion formed into a non-developable sheet. In this instance the composite diaphragm may be formed by welding or brazing a thin sheet of iron 31 to a sheet of brass or copper 32. The diaphragm is shaped into a dished or non-developable surface with the iron sheet on the normally convex side of the diaphragm. If a thermostatic sheet or diaphragm is thus constructed it will be found that upon raising the temperature of the sheet the unequal expansion of the materials forming the sheet will tend to flatten the concavity until at a predetermined temperature a sudden curving of the dished form into the opposite direction occurs, which reversal of shape will be maintained until the temperature has been substantially lowered when the diaphragm will suddenly regain its normally dished shape. When the diaphragm is normally concavo-convex and the valve is on the normally concave side it will be held tightly on its seat, but when the form of the diaphragm is reversed the valve will be lifted from its seat and allow the fluid to pass through the openings 17 formed in the diaphragm. This type of valve will respond very readily to temperature changes either in the fluid passing through the valve or to the temperature of the valve body. The valve will be opened when the temperature rises a predetermined amount and will close when the temperature is lowered. It is particularly adapted as a fuel cut off valve in gas burners for cutting off the flow of gas to the main burner when the pilot light is extinguished. In such an arrangement the pilot light would be in contact with the valve body and keep its temperature above that necessary to operate the diaphragm to a reverse position or that which will keep the valve open.

It is believed that the foregoing description conveys a clear understanding of the objects and advantages of my invention. While I have illustrated and described the application thereof in the case of water heaters and ovens, it should be understood that there are numerous other possible applications. All legitimate modifications and adaptations of my invention are therefore to be construed as coming within the spirit and scope of the appended claims.

I claim:

1. In a valve, a valve casing, a flexible diaphragm dividing the casing into two compartments one of which has an inlet and the other an outlet, valve ports in said diaphragm, and a valve member arranged to open and close said valve ports when the center of the diaphragm is moved away from a straight diametrical line.

2. In a valve, a valve casing, a flexible diaphragm dividing the casing into two compartments one of which has an inlet and the other an outlet, valve ports in said diaphragm, a valve member arranged to open and close said valve ports, said valve member being carried by said diaphragm, and means for actuating said valve member to an open and/or closed position.

3. In a valve, a valve casing, a dished flexible diaphragm dividing the casing into two compartments one of which has an inlet and the other an outlet, valve ports in said diaphragm, a valve member arranged to open and close said valve ports, said valve member being carried by said diaphragm and seated on the normally dished side of the diaphragm, and means for unseating the valve member to open the valve ports by moving the center of the diaphragm over its dead center into a reverse form.

4. A device as set forth in claim 1 including thermal responsive means for actuating the valve member to an open and/or closed position in response to temperature changes.

5. A device as set forth in said claim 1 and including a lever system for amplifying said actuating movement.

6. A device as set forth in claim 2 and including an adjustment means for advancing or retarding the opening or closing of the valve member in response to temperature changes.

7. In a valve, a valve casing, a flexible diaphragm dividing the casing into two compartments one of which has an inlet and the other an outlet, fluid passageways in said diaphragm connecting the two compartments, and a valve member carried by the diaphragm in the outlet compartment to control the flow of the fluid through said passageways when the center of the line is moved toward the inlet side or compartment.

8. In a thermostat, the combination with thermal responsive means arranged to have movement in response to temperature variation, of a snap valve comprising a casing, a dished spring diaphragm dividing the casing into two compartments, one of which has an inlet and the other an outlet, and arranged with the normally concave side toward the inlet side, said diaphragm tending to maintain itself on one side of its neutral point and arranged to be moved past its neutral point to the other side by said thermal responsive means, one or more valve ports in said diaphragm, a valve member carried by said diaphragm on the normally concave side thereof for controlling the fluid flow through said valve ports, said valve member being unseated when the center of the diaphragm is moved past its neutral point by the thermal responsive means and seated when the diaphragm regains its normal dished form.

9. A device as set forth in claim 8 and including adjustment means for advancing or retarding the opening or closing of said valve member.

10. In a thermostat, the combination with thermal responsive means arranged to move according to temperature variations, a valve casing, a normally concavo-convex diaphragm dividing the casing into two compartments one of which has an inlet and the other an outlet, said diaphragm being arranged with the normally concave side toward the inlet, valve ports in said diaphragm, a valve member carried by said diaphragm on the normally concave side thereof to close said valve ports when the diaphragm is normally concave, and an amplification lever system arranged intermediate said thermal responsive means and the normally convex side of the diaphragm to amplify and transmit any movement of the thermal responsive means to the convex side of the diaphragm, said diaphragm and said lever system being so arranged that when the amplified movement and pressure is sufficient the center of the diaphragm will move toward and over dead center into a reverse or convexo-concave form, which movement causes the valve member to unseat itself and permit the fluid to pass through the valve ports.

11. A device as set forth in claim 10 and including adjustment means for advancing or retarding the actuating movement of the said lever system with reference to the diaphragm.

12. A thermostat comprising a valve casing, a dished diaphragm of bimetallic thermostatic metal dividing the casing into two compartments, one of which has an inlet and the other an outlet, said diaphragm having its outer portion of the sheets forcing the inner portion to remain normally concave or dished on the side having the higher coefficient of expansion and preventing free expansion of said inner portion when heated but which causes the diaphragm to pass abruptly and automatically to a position of opposite curvature at a predetermined temperature, valve ports in said diaphragm, and a valve member carried by said diaphragm to open and close said valve ports in response to temperature changes, said valve member being arranged to seat itself on the normally concave side of the diaphragm and to unseat itself when the diaphragm attains opposite curvature due to temperature changes.

13. In a valve, a valve casing, a dished spring diaphragm dividing the casing into two compartments one of which has an inlet and the other an outlet, fluid passageways in said diaphragm, and a mushroom valve means carried by said diaphragm, said valve having a cupped edge overlapping said passageways in said diaphragm for preventing the flow of a fluid through said passageways when the diaphragm is moved past dead center into a reverse form.

14. A device as set forth in claim 13, and including thermal responsive means to actuate the diaphragm.

15. A device as set forth in claim 13, and including adjustment means for controlling the actuation according to temperature changes.

16. In a thermostatic valve, a valve casing, a dished flexible diaphragm having the property of regaining its normal dished form when flexed into a reverse form and dividing the casing into two compartments, one of which has an inlet and the other an outlet, fluid passageways in said diaphragm, a mushroom valve on said diaphragm, said valve having a cupped knife edge overlapping said passageways in said diaphragm for controlling the flow of fluid through said passageways when the diaphragm is flexed into a reverse form, and thermal responsive means for actuating said diaphragm.

17. A device as set forth in claim 16, and including adjustment means for controlling the actuation of said diaphragm according to temperature changes.

18. In a thermostat including a flexible diaphragm having fluid passageways therethrough, a mushroom valve mounted on said flexible diaphragm and adapted to close the fluid passageways when the flexible diaphragm is released said mushroom valve having cupped edges overlapping said passageways, said mushroom valve being resilient centrally of said cupped edges whereby the center of said mushroom valve may resiliently yield after said cupped edges have contacted with said flexible diaphragm.

SIDNEY P. VAUGHN.